United States Patent [19]

Pagendarm et al.

[11] Patent Number: 4,886,564

[45] Date of Patent: Dec. 12, 1989

[54] METHOD OF AND APPARATUS FOR APPLYING COATING MATERIAL TO A RUNNING SUBSTRATE

[75] Inventors: Ralph Pagendarm, Halstenbek; Albert Hebels, Hamburg, both of Fed. Rep. of Germany

[73] Assignee: Pagendarm Beschichtungstechnik GmbH, Hamburg, Fed. Rep. of Germany

[21] Appl. No.: 111,403

[22] Filed: Oct. 20, 1987

[30] Foreign Application Priority Data

Nov. 18, 1986 [DE] Fed. Rep. of Germany ....... 3639487

[51] Int. Cl.$^{4}$ ................................................ B32B 3/14

[52] U.S. Cl. ................................... 156/230; 156/231; 156/238; 156/249; 156/497; 156/501; 156/540; 34/27; 34/32; 34/36; 118/61; 427/402

[58] Field of Search ............... 156/230, 231, 238, 242, 156/243, 249, 497, 501, 540; 427/345, 348, 377, 398.4, 402; 118/50, 61; 34/11, 16, 27, 32, 34, 36, 40, 78, 84

[56] References Cited

U.S. PATENT DOCUMENTS

| | | | |
|---|---|---|---|
| 2,336,745 | 12/1943 | Manning | 156/501 |
| 4,150,494 | 4/1979 | Rothchild | 34/36 |
| 4,233,358 | 11/1980 | Jones et al. | 156/230 |
| 4,326,343 | 4/1982 | Rathmell | 118/61 |
| 4,370,357 | 1/1983 | Swartz | 118/61 |
| 4,411,075 | 10/1983 | Blaudszun | 34/32 |
| 4,475,293 | 10/1984 | Banerjee | 34/27 |
| 4,698,110 | 10/1987 | Vassiliou | 156/246 |

*Primary Examiner*—Caleb Weston
*Attorney, Agent, or Firm*—Peter K. Kontler

[57] ABSTRACT

A running strip-shaped substrate of paper or thermoplastic material is provided with several layers of adhesive or other coating material at a transfer station where it comes in contact with discrete layers of coating material which are supplied by individual belt conveyors and are heated during travel with the respective conveyors to promote the expulsion of solvent which is gathered by individual streams of an inert gas flowing counter to the direction of travel of the layers with the conveyors. The layers are heated by the respective conveyors each of which is heated by a discrete heating device.

22 Claims, 3 Drawing Sheets

METHOD OF AND APPARATUS FOR APPLYING COATING MATERIAL TO A RUNNING SUBSTRATE

CROSS-REFERENCE TO RELATED CASE

The apparatus of the present invention is similar to that which is disclosed in commonly owned copending patent application Ser. No. 103,421 filed Sept. 30, 1987, now U.S. Pat. No. 4,764,402, by Ralph Pagendarm et al. for "Method of and apparatus for applying coating material to a running web".

BACKGROUND OF THE INVENTION

The invention relates to a method of and to an apparatus for applying one or more layers of coating material to a substrate, such as a strip or web of textile material, paper (e.g., crepe paper), metallic foil or plastic foil (e.g., a foil of thermoplastic material). More particularly, the invention relates to improvements in methods and apparatus of the type wherein one or more layers of coating material (such as adhesive layers, coloring matter, impregnating substances and the like) are transferred to a substrate, especially to a continuously running substrate, by means of one or more web-like carriers.

It is often necessary and/or desirable to avoid direct application of coating materials to a running substrate (e.g., a substrate which, together with the layer or layers of coating material, is to constitute an adhesive tape, a band aid or the like). For example, if the coating material contains an evaporable solvent which is to be recovered for reuse or to avoid contamination of the surrounding area, the coating material is first applied to one or more web-like carriers and the solvent is expelled from the individual layer or layers on the carrier or carriers prior to transfer of the desolventized layer or layers onto the substrate. It is also known to heat the layer or layers on the respective carrier(s) to promote the evaporation of solvent prior to transfer of the layer or layers onto the substrate. As a rule, the solvent is recovered by contacting the layer or layers with an inert gas, such as nitrogen.

OBJECTS AND SUMMARY OF THE INVENTION

An object of the invention is to provide a novel and improved method of enhancing the efficiency and economy of heretofore known methods of applying one or more layers of coating material to a running substrate of paper, thermoplastic material or the like.

Another object of the invention is to provide a method which renders it possible to recover the evaporated solvent or solvents in a small area and with a high degree of efficiency.

A further object of the invention is to provide a method which renders it possible to recover a higher percentage of solvents than in accordance with heretofore known proposals.

An additional object of the invention is to provide a method which can be practiced in connection with a wide variety of substrates and coating materials.

Still another object of the invention is to provide a novel and improved apparatus for the practice of the above outlined method and to construct and assemble the apparatus in such a way that it can reliably ensure the evaporation of desired quantities of solvent prior to the application of one or more layers of desolventized coating material to a running substrate, particularly to a continuously running substrate of paper or the like.

A further object of the invention is to provide the apparatus with novel and improved means for relieving the layer or layers of coating material of desired quantities of solvent.

Another object of the invention is to provide the apparatus with novel and improved carriers for layers of coating material.

An additional object of the invention is to provide the apparatus with novel and improved means for recovering and gathering solvents which are expelled from layers of coating material A further object of the invention is to provide the apparatus with novel and improved means for desolventizing one or more layers of adhesive, coloring matter or the like with a higher degree of efficiency and economy than in heretofore known apparatus.

One feature of the invention resides in the provision of a method of coating a substrate, particularly a continuously running substrate, with coating material. One embodiment of the method comprises the steps of coating a continuously running substrate of paper, textile material or the like by means of (i.e., with assistance from) at least one running web, and such steps include applying to the running web a layer of moisture-containing coating material (e.g., an adhesive substance), heating the web to thus expel at least some moisture from the layer of coating material, and transferring the thus dried or partially dried layer from the web onto the substrate. The heating step can precede or can take place simultaneously with the applying step. The method can further comprise the step of contacting the layer of coating material on the web with a flowing gaseous fluid, such as an inert gas, to entrain the vaporized moisture. Such method preferably further comprises the step of advancing the web and the layer thereon in a predetermined direction, and the contacting step preferably includes conveying the gaseous fluid along the layer on the web counter to the predetermined direction.

The temperature of gaseous fluid which is caused to contact the layer on the running web is preferably maintained within a predetermined range.

The above outlined method can further comprise the steps of applying to an additional running web an additional layer of coating material (the composition of such coating material may but need not be identical with that of coating material on the at least one web) and transferring the additional layer onto the substrate so that one of the transferred layers overlies the other layer, i.e., that the layers are applied to the substrate on top of each other. The additional web can be heated independently of the at least one web to expel moisture from the layer on the additional web prior to the respective transferring step. The layer on the additional web is preferably contacted by a discrete additional stream of a gaseous fluid which can entrain the evaporated moisture to a predetermined location.

Another embodiment of the method involves providing a substrate with a composite coat and comprises the steps of forming a plurality of discrete layers each containing different moist coating materials, drying the layers to expel at least some moisture therefrom, contacting the layers with discrete streams of a gaseous fluid to entrain vaporized moisture to one or more predetermined locations, and transferring the layers onto the substrate so that the transferred layers overlie each other and constitute or form part of the composite coat at one side of the substrate. The drying step can include heating the layers to a temperature at which at least some of the moisture which is contained therein is caused to evaporate so that the vapors can be entrained by the respective streams of gaseous fluid, particularly by an inert gas such as nitrogen.

Another feature of the invention resides in the provision of an apparatus for coating a substrate with a coating material, such as an adhesive substance. One embodiment of the apparatus is designed to coat a continuously running substrate, and such apparatus comprises at least one web-like carrier, means for advancing the carrier along a predetermined path, means for applying to the carrier a layer of moist coating material in a first portion of the predetermined path, means for heating the carrier so as to dry the layer of coating material, and means for transferring the thus (fully or partially) dried layer from the carrier onto the substrate in a second portion of the predetermined path. Such apparatus further comprises means for advancing the substrate (e.g., an elongated strip of paper, textile material or metallic or plastic foil) along the second path having a portion which is adjacent the second portion of the predetermined path.

The carrier can include an endless belt conveyor having an elongated reach which serves to advance the layer from the first to the second portion of the predetermined path. The apparatus preferably further comprises a source of gaseous fluid (e.g., nitrogen or another inert gas) and means for conveying at least one stream of gaseous fluid from the source along the layer on the aforementioned reach of the belt conveyor. The conveying means is preferably immediately or closely adjacent the layer on the conveyor and preferably includes a chamber having an open side which faces the layer on the elongated reach of the conveyor. The carrier includes means for moving the elongated reach so as to advance the layer in a direction from the first to the second portion of the predetermined path, and the conveying means is preferably designed to convey the gaseous fluid along the layer but counter to the direction of advancement of the layer.

The apparatus can comprise an additional web-like carrier, means for advancing the additional carrier along an additional path, means for applying to the additional carrier a layer of moist coating material in a first portion of the additional path, means for heating the additional carrier so as to at least partially dry the layer of coating material on the additional carrier, and means for transferring the at least partially dried layer from the additional carrier onto the substrate in a second portion of the additional path so that one of the layers on the substrate overlies the other layer. The additional carrier can also include an endless belt conveyor having an elongated reach which transports the respective layer from the first to the second portion of the respective path. The reaches of the belt conveyors are or can be at least substantially parallel to each other. Means can be provided to convey at least one stream of gaseous fluid from the aforementioned source or from an additional source so that the stream flows along and contacts the layer of coating material on the elongated reach of the belt conveyor forming part of the additional carrier. The means for conveying the gaseous fluid can comprise a discrete gas conveying unit for each belt conveyor. Each unit can comprise a chamber which is adjacent the elongated reach of the respective belt conveyor and has an open side facing the layer on the respective reach. Each chamber preferably includes an inlet which is connected to the source of gaseous fluid and an outlet which is located upstream of the inlet (as considered in the direction of advancement of the respective layer) so that the streams of gaseous fluid flow counter to the direction of advancement of the respective layers.

Each heating means can be designed in such a way that it is adjacent the uncoated side of the elongated reach of the respective belt conveyor. Each such heating means can include a plurality of substantially rod-shaped electric heating elements. Alternatively, each heating means can comprise an inductive heater including a portion at least of the respective carrier. For example, each carrier can° include an iron core constituting the secondary winding of an inductor having a primary winding. Each heating means can comprise an adjustable heater, and such apparatus then further comprises means for adjusting the heater so as to ensure that the respective carrier is heated to a predetermined temperature or that its temperature is maintained within a preselected range. The adjusting means can include means for monitoring the temperature of the respective carrier and means for altering the heating action of the respective heater when the monitored temperature deviates from a preselected temperature or from a preselected range of temperatures.

Another embodiment of the improved apparatus is designed to coat a substrate with coating material and comprises a plurality of web-like carriers, means for advancing the carriers along predetermined paths, means for applying to each carrier a layer of coating material in a first portion of the respective path (the composition of at least one layer is or can be different from that of at least one other layer), means for transferring the layers from the respective carriers onto the substrate in second portions of the respective paths, and means for contacting the layers on the carriers with separate streams of a gaseous fluid (such streams can but need not issue from a common source of gaseous fluid and each stream may but need not contain the same gaseous fluid (such as nitrogen or another inert gas).

As a rule, the layers which are applied to the carriers contain moisture, and the just outlined apparatus preferably further comprises means for drying the layers so as to expel at least some moisture. The expelled moisture can be entrained by the respective streams of gaseous fluid. Each carrier can include an endless belt conveyor having an elongated stretch or reach which advances the respective layer from the first to the second portion of the respective path.

Each belt conveyor can comprise a first or inner stratum and a second or outer stratum which is disposed between the first stratum and the respective layer. The first strata can be identical in each belt conveyor. The composition of the second strata may vary from belt conveyor to belt conveyor; for example, one of the outer strata can attract the respective layer with a relatively large force (i.e., such one outer stratum can exhibit a relatively large adhesive power to attract the respective layer). On the other hand, another outer stratum can have entirely different or quite different properties, such as dehesive properties so that it actually repels or only slightly attracts the respective layer during travel of the layer with the aforementioned reach of the respective belt conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
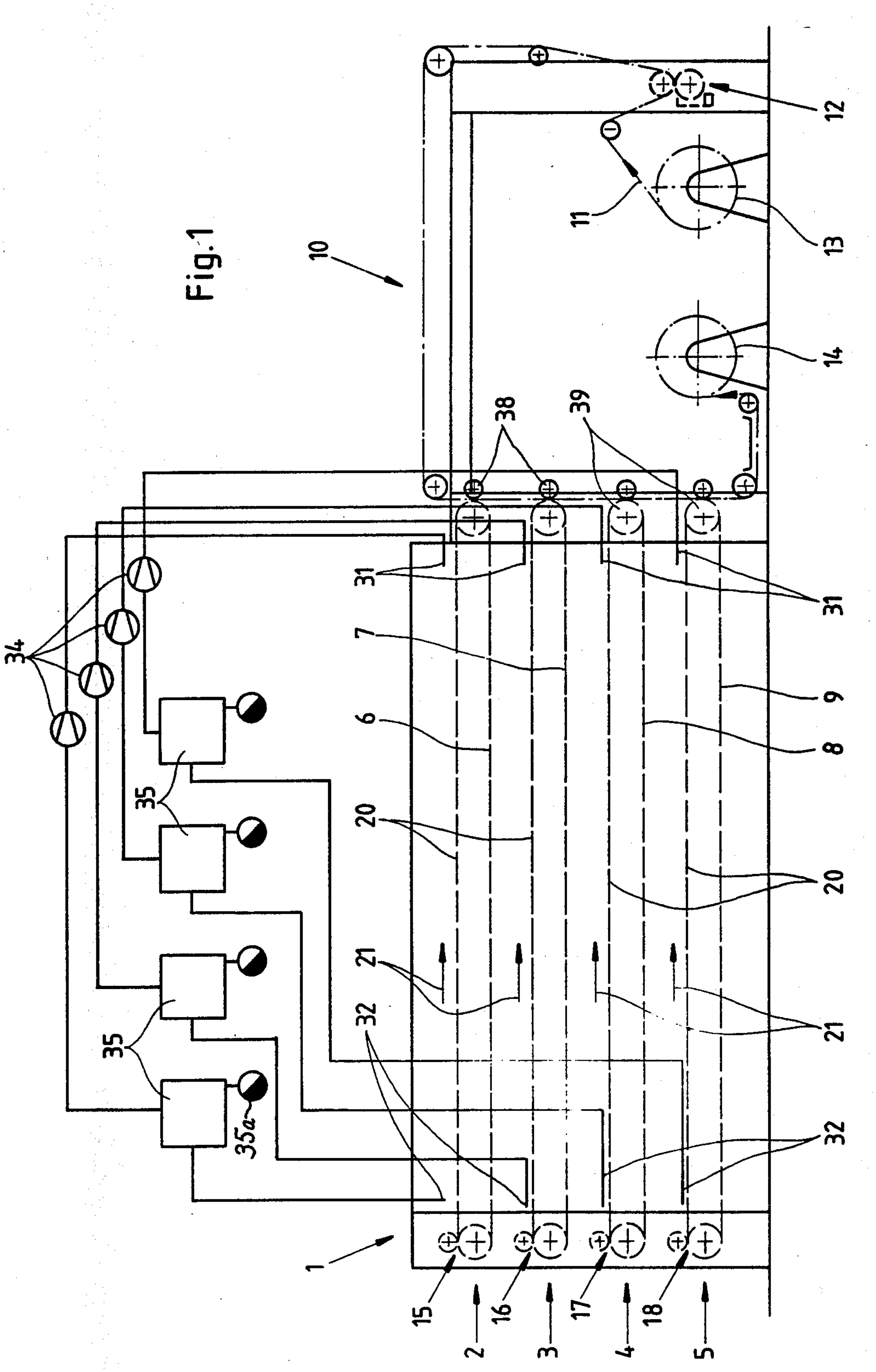
FIG. 1 is a schematic partly elevational and partly vertical sectional view of an apparatus which embodies the invention.

FIG. 1 shows an apparatus wherein one side of a continuously running flexible strip- or web-shaped substrate 11 is provided with four superimposed layers of coating material, e.g., an adhesive substance or a coloring agent. The apparatus comprises a first coating unit 10 which embodies a device 12 for applying a first or base layer directly to one side of the substrate 11. A second coating unit 1 of the apparatus which is shown in FIG. 1 employs four web-like carriers of discrete layers of coating material. The topmost carrier 2 includes an endless belt conveyor 6 having a horizontal upper stretch or reach 20, the next carrier 3 includes an endless belt conveyor 7 having a horizontal upper reach 20, the third carrier 4 comprises an endless belt conveyor 8 having a horizontal upper reach 20, and the lowermost carrier 5 includes an endless belt conveyor 9 having a horizontal upper reach 20.

The first coating unit 10 comprises the aforementioned device 12 serving for direct application of the base layer to one side of the running substrate 11 which is drawn off a supply reel 13 and is being collected by a takeup reel 14. The means for confining the substrate 11 to movement along a predetermined path comprises a plurality of pulleys including a set of pulleys 38 at a transfer station where the layers of coating material which have been applied to the upper sides of the horizontal reaches 20 of carriers 6–9 are transferred onto the base layer on the substrate 11. The means for advancing the substrate 11 along its path comprises a motor or another suitable prime mover (not shown) which drives the takeup reel 14 in a clockwise direction. The substrate 11 can consist of or can contain a web or strip of crepe paper, textile material, thermoplastic material or metallic foil. For example, the substrate 11 can be made of light-transmitting plastic material and is to be provided with a total of five layers of adhesive material to constitute a length of adhesive tape.

The carriers 2–5 are driven (e.g., by their front pulleys 39 at the transfer station) to advance in directions which are indicated by arrows 21. Each of these carriers is continuously provided with a layer of coating material by a discrete applying means or applicator (15, 16, 17, 18) in a first portion of its path, and the thus formed layers are treated during travel with the respective upper reaches 20 to be transferred onto the substrate 11 in second portions of the paths of the respective belt conveyors 6–9, namely in the regions of the pulleys 39 where the paths of the belt conveyors are adjacent a portion of the path of advancement of the substrate 11.

Figure 3:
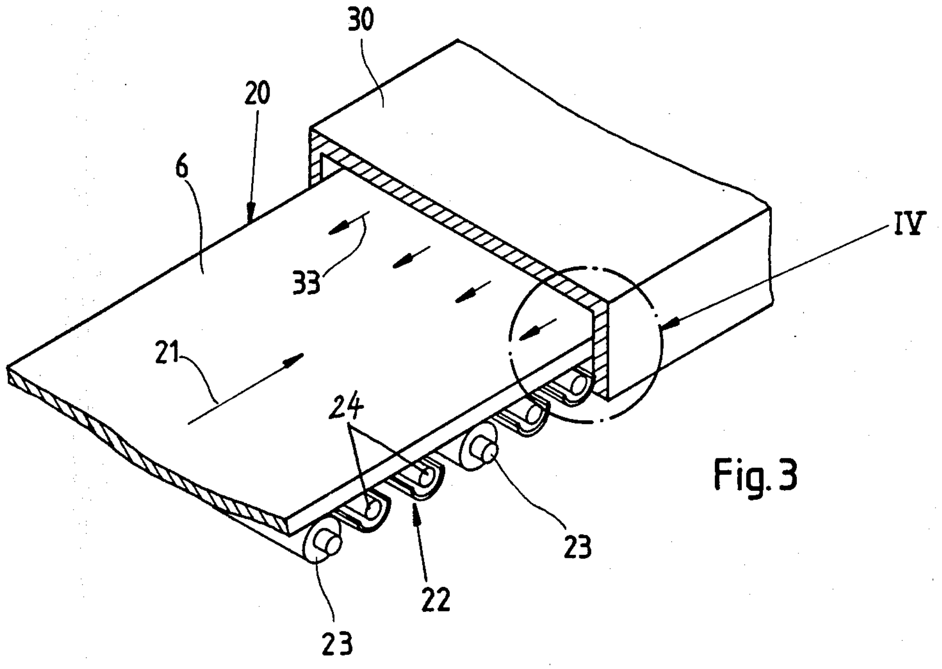
FIG. 3 is an enlarged fragmentary perspective view of a detail in the structure of FIG. 2.
Figure 4:
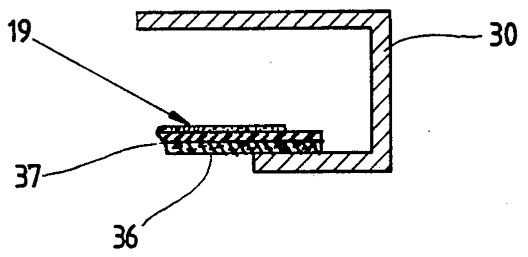
FIG. 4 is an enlarged view of the detail within the phantom-line circle IV in FIG. 3.

FIG. 4 shows a thin and readily flowable moist (solvent-containing) layer 19 which is applied by the applying means or applicator 15 to the upper reach 20 of the topmost belt conveyor 6 while the upper reach continuously advances in the direction of arrow 21 (see also FIG. 3). In accordance with a feature of the invention, the thin layer 19 of coating material is indirectly heated to promote a reduction of its moisture content, i.e., to promote the expulsion of solvent, by heating the upper reach 20 of the belt conveyor 6 in the region between the applicator 15 and the respective pulley 39 (at the transfer station between the belt conveyors 6–9 and the substrate 11). The layer 19 is carried by the upper side of the horizontal reach 20, and the underside of this reach is heated by a heating device 22 including a set of transversely extending substantially rod-shaped commercially available electric heating elements 24 each of which is preferably surrounded by a trough-shaped reflector to intensify the heating action upon the upper reach 20 (i.e., the expulsion of solvent from the layer 19). The heating elements 24 are connected to a source of electrical energy in any suitable manner (not shown in the drawing) and preferably alternate with supporting rollers 23 for the upper reach 20 of the belt conveyor 6. The heated upper reach 20 transmits heat directly to the layer 19 so that the latter is dried to a desired extent and is relieved of all or nearly all of the solvent which evaporates and is entrained and advanced to a gathering location by a stream of an inert gaseous fluid (such as nitrogen) flowing along the layer 19 counter to the direction indicated by arrow 21.

Figure 2:
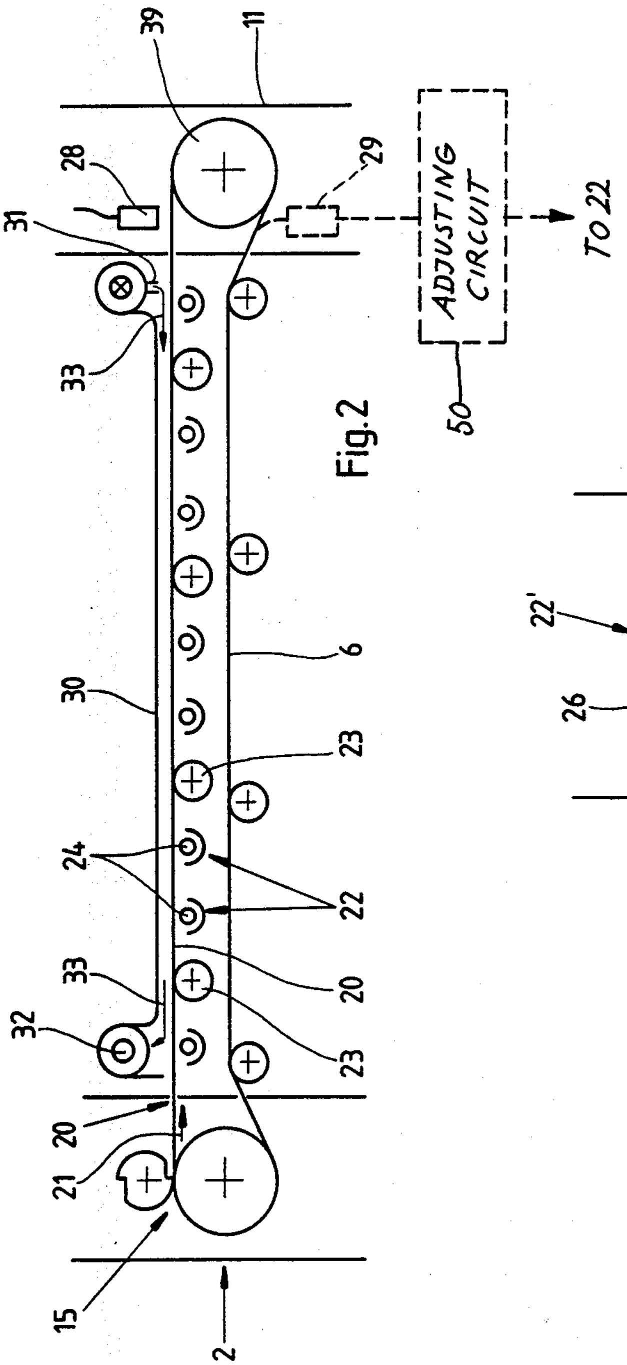
FIG. 2 is an enlarged view of a detail in the apparatus of FIG. 1, showing one form of means for heating a web-like carrier and a presently preferred form of means for contacting the layer of coating material on the carrier with a stream of gaseous fluid.

As shown in FIG. 2, the temperature of the belt conveyor 6 is monitored, either indirectly by a first temperature sensing element 28 or directly by a temperature sensing element 29 which directly contacts the lower reach of the belt conveyor 6 in the region of the respective pulley 39. The selected sensing element 28 or 29 is a component part of a means for adjusting the heating device 22 including the heating elements 24 of FIG. 3 in that it transmits appropriate signals to a circuit 50 (connected in FIG. 2 to the sensing element 29) which regulates the supply of electrical energy to the elements 24 with a view to ensure that the temperature of the upper reach 20 of the belt conveyor 6 is maintained at a preselected value or within a preselected range of acceptable temperatures.

The manner of heating the upper reaches 20 of the belt conveyors 7–9 is preferably identical with the aforedescribed manner of heating the upper reach 20 of the topmost belt conveyor 6. This also applies for the manner of conveying an inert gaseous fluid along the layers which are formed on the upper reaches of the belt conveyors; therefore, FIG. 2 merely shows the means for conveying a stream of gaseous fluid along the layer 19 on the upper side of the upper reach 20 of the belt conveyor 6. Such conveying means includes a source 35 (FIG. 1) of inert gaseous fluid (e.g., nitrogen), a chamber 30 which has an open underside facing the layer 19 on the upper reach 20 of the belt conveyor 6, and a pump 34 which conveys gaseous fluid from the source 35 to an inlet 31 at the downstream end of the upper reach 20. The stream (denoted by the arrows 33) flows along the layer 19 counter to the direction (arrow 21) of advancement of the upper reach 20 of the belt conveyor 6 and is evacuated by way of an outlet 32 which is located upstream of the inlet 31 (as viewed in the direction of arrow 21). The configuration of the chamber 30 can also be seen in FIGS. 3 and 4. All that counts is to ensure that the stream of inert gaseous fluid entrains the evaporated solvent into the respective source 35 which is equipped with means for maintaining the inert gaseous fluid at a preselected temperature or within a preselected temperature range as well as with means for recovering the solvent from the gaseous fluid. The recovered solvent is accumulated at 35*a*. The source 35 can constitute a condenser for vaporized solvent.

FIG. 1 shows a discrete source 35 and a discrete pump 34 for each of the four belt conveyors 6–9. The sources 35 and the paths for the flow of gaseous fluid from such sources, along the respective upper reaches 20 and back to the sources are preferably sealed from each other so that it is possible to independently recover the solvents, e.g., if each of the applicators 15–18 applies a different coating material containing a different solvent.

FIG. 4 shows that the belt conveyor 6 can comprise two strata including an inner stratum 36 which can be the same for all four belt conveyers 6–9 and can consist of a woven textile material, and an outer stratum 37 (e.g., a synthetic plastic substance) having optimum adhesive or dehesive properties for the respective layer of coating material. Thus, each of the four belt conveyors 6–9 can include a stratum 36 which is the same for all carriers but a different stratum 37 which is best suited to ensure proper adherence of the respective layer of coating material as well as a predictable and preferably full separation of dried or partially dried layer at the transfer station where the layers are applied to the running substrate 11 in such a way that they overlie each other and one thereof overlies the base layer which is being applied by the device 12.

Figure 5:
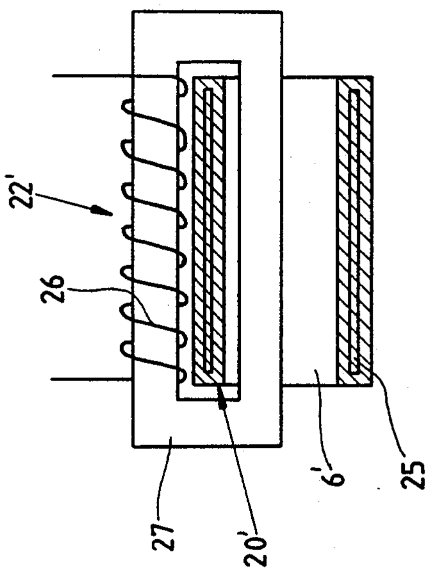
FIG. 5 is a partly sectional view of modified means for heating a web-like carrier in an apparatus of the type shown in FIG. 1.

FIG. 5 shows a modified heating device 22′ wherein the belt conveyor 6′ has a flexible iron core 25 constituting the secondary winding of an inductor 27 carrying a primary winding 26. Successive increments of the upper reach 20′ of the belt conveyor 6′ travel through the frame-like body of the inductor 27 whereby the belt conveyor 6′ is heated to a desired temperature to heat the layer of coating material thereon with the result that the solvent is caused to evaporate and can be entrained and recovered by a stream of inert gaseous fluid. The structure of FIG. 5 can be said to constitute an inductive heater which is actually a transformer with a mobile secondary winding 25 forming part of the continuously driven belt conveyor 6′.

An important advantage of the improved method and apparatus is that the layers of coating material on the reaches 20 of the belt conveyors 6–9 are dried through the medium of the respective strata 36 and 37. This reduces the likelihood of actually charring or otherwise affecting the quality and/or appearance of the layers 19. It has been found that desired quantities of solvent can be expelled from the layers 19 with a high degree of accuracy and predictability. As used herein, the term "drying" is intended to denote expulsion of at least some solvent so that the thus expelled solvent can be entrained by the respective streams of gaseous fluid. It will be readily appreciated that, if the layers 19 consist of an adhesive material which is to adhere to the base layer on the substrate 11 or t a previously applied layer, the drying action is not carried out to such an extent that the dried layer would be incapable of adhering to the base layer and/or to another layer 19 on the substrate 11.

Referring again to FIG. 2, the heating elements 24 of the drying or heating device 22 could be placed adjacent the lower reach of the conveyor 6 without departing from the spirit of the invention. In either event, the conveyor 6 is heated upstream of the applicator 15 so that the evaporation of solvent can begin as soon as the layer 19 is applied to the upper reach 20.

Another important advantage of the improved apparatus is that it can operate with relatively small quantities of an inert gaseous fluid. This is due to the fact that the heating or drying action is not carried out (or need not be carried out exclusively) by the gaseous fluid but rather by the respective belt conveyor, i.e., by the corresponding web-like carrier. The primary or sole purpose of the gaseous fluid is to entrain the evaporated solvent into the respective source 35 where the solvent can be confined and recovered for renewed use or for disposal in a region where it cannot contaminate the atmosphere or create the danger of explosion. While it is also possible to convey the streams of gaseous fluid in the direction (arrows 21) of travel of the upper reaches 20 of the belt conveyors 6–9, it is presently preferred to convey the streams 33 counter to the direction of advancement of the layers 19. This ensures a continuous and gradual enrichment of the streams 33 with expelled solvent while the streams flow from the respective inlets 31 toward and into the respective outlets 32. The gaseous fluid in the sources 35 can be tempered in such a way that, if necessary, it contributes to a heating of the respective layer 19 to thus further enhance the expulsion of solvent. As a rule, the temperature of the gaseous fluid will be selected primarily with a view to ensure that the streams 33 can entrain large quantities of expelled solvent.

While it is also within the purview of the invention to employ a single web-like carrier which gathers a relatively thick layer of adhesive or other coating material, it is presently preferred to employ two, three, four or even a larger number of carriers so as to render it possible to form a series of relatively thin layers 19 each of which can be more readily heated to a desired temperature (with attendant expulsion of requisite quantities of solvent) than single but relatively thick layer. As shown in FIG. 1, each of the four layer on the conveyors 6–9 can be contacted by a discrete stream of gaseous fluid. Moreover, each reach 20 is or can be heated by a discrete heating device whose heating action can be adjusted independently of the other heating devices. This renders it possible to regulate the expulsion of solvent from conveyor to conveyor as well as to ensure that the expelled and collected solvents cannot mix if such mixing is dangerous or is undesirable for other reasons.

The placing of conveyors 6–9 into parallel horizontal planes, one above the other, contributes to compactness and lower cost of the apparatus. The energy requirements of such compact apparatus are relatively low because the layers 19 on the upper reaches 20 can be dried during travel along relatively short paths (this reduces the cost of heating the conveyors) and also because the gaseous fluid need not be heated at all or need not be heated to an elevated temperature since at least a substantial part of the heating (solvent-expelling) action is performed by the conveyors 6–9. The paths for the flow of discrete streams of gaseous fluid are short, and the apparatus need not be provided with several temperature zones such as would normally contribute to energy and space requirements of the apparatus.

The provision of discrete paths for streams of gaseous fluid is especially desirable and advantageous if the layers 19 on the upper reaches of two or more conveyors 6–9 have different compositions and must be contacted by different gaseous fluids and/or by differently tempered fluids. The provision of separate paths for the streams of gaseous fluid renders it possible to separately gather and recover different solvents. It is often necessary to provide a substrate with a composite coat which contains different layers of an adhesive or other material. Such composite coat can be readily formed in the improved apparatus. For example, an adhesive tape can be produced at a lower cost if the composite coat of adhesive at one side of the substrate includes a highly adhesive or rather strongly adhesive outer layer and one or more inner layers whose adhesive properties are less satisfactory than those of the outer layer.

The improved apparatus could employ elongated web-like carriers of finite length. Carriers which constitute or include endless belt conveyors are preferred at this time because they need not be rewound from time to time and also because they can be heated in a simpler, more efficient and less expensive way.

The composition of the gaseous fluid depends on the nature of the respective layers of coating material. In many instances, the gaseous fluid is nitrogen or another inert gas. Such gases are expensive so that the aforediscussed savings in gaseous fluid (which need not perform any or need not perform the entire heating and solvent-expelling action) contribute significantly to lower cost of the improved method and apparatus. The means for supplying gaseous fluid which is to contact the layers 19 are relatively simple and inexpensive because each such supplying means can comprise a pump 34 and a single chamber 30 which need not be subdivided into two or more compartments and which is simply connected with the respective pump at one end and with the respective source 35 of gaseous fluid at the other end. Relatively flat chambers 30 suffice to ensure the flow of adequate quantities of gaseous fluid because the fluid need not heat the respective layers but merely serves to entrain the expelled solvent. At any rate, the heating action of the gaseous fluid need not be pronounced and can be nil. As can be seen in FIGS. 3 and 4, each chamber 30 can spacedly surround the marginal portions of the respective upper reach 20 and can also extend to the undersides of the marginal portions of the inner strata 36 to further reduce the likelihood of escape of gaseous fluid from the respective region or zone of the coating unit 1. The substantially tangential streams 33 are continuously and gradually enriched with expelled solvent as they flow from the inlets 31 toward and into the outlets 32 of the respective chambers 30.

In many instances, the temperature of the upper reach 20 of each conveyor is maintained at a temperature of 70°–90° C. The placing of heating elements 24 adjacent the undersides of the upper reaches 20 is desirable and advantageous because this ensures that the upper reaches can be heated at the exact rate or close to the rate at which they transmit heat energy to adjacent portions of the running layers 19. Thus, such positioning of the heating elements 24 ensures that the temperature of the belt conveyors 6–9 does not drop excessively during travel with the respective layers 19 from the applicators 15–18 to the transfer station in the region of the pulleys 39 and 38. Excessive cooling of conveyors 6–9 could take place if they were heated only in the regions of the respective applicators 15–18. The rod-shaped heating elements 24 are preferred at this time; however, it is equally possible to employ heating devices wherein the rod-shaped elements 24 are replaced by or are used jointly with plate-like heating elements Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of coating a continuously running substrate by means of a plurality of running webs, comprising the steps of applying to a first running web a layer of coating material which contains an evaporable solvent; thereafter heating the first web to thus expel at least some solvent from the layer of coating material; a first contacting step of contacting the layer of coating material on the first web with a flowing inert gas to gather the expelled solvent; transferring the thus dried layer from the first web onto the substrate; applying to an additional running web an additional layer of coating material which contains an evaporable solvent; heating the additional web to expel at least some solvent from the additional layer; a second contacting step of contacting the layer of coating material on the additional web with a discrete stream of an inert gas to gather the solvent which is expelled from coating material on the additional web; and transferring the additional layer onto the substrate so that one of the layers on the substrate overlies the other layer.

2. The method of claim 1, further comprising the step of advancing the first web and the layer thereon in a predetermined direction, said first contacting step including conveying the inert gas along the layer on the first web counter to said direction.

3. The method of claim 1, further comprising the step of maintaining the temperature of inert gas within a predetermined range.

4. A method of providing a substrate with a composite coat, comprising the steps of forming a plurality of discrete layers containing different coating materials and an evaporate solvent and wherein each layer is formed on a separate running web; separately drying said discrete layers to expel at least some solvent therefrom by heating the web; contacting each layer with a discrete stream of an inert gas to gather the expelled solvent; and transferring the layers from the webs onto the substrate so that the transferred layers overlie each other and form part of or constitute the composite coat.

5. Apparatus for coating a continuously running substrate with coating material, comprising a plurality of web-like carriers; means for advancing a first carrier of said plurality of carriers along a predetermined path; means for applying to the first carrier in a first portion of said path a layer of coating material containing an evaporable solvent; means for heating the first carrier so as to at last partially expel solvent from the layer of coating material; a source of inert gas; means for conveying inert gas from said source along the layer to gather the expelled solvent; means for transferring the thus heated layer from the first carriers onto the substrate in a second portion of said path; means for advancing an additional carrier of said plurality of carriers along an additional path; means for applying to the additional carrier in a first portion of said additional path a layer of coating material containing an evaporable solvent; means for heating the additional carrier so as to at least partially expel solvent from the layer of coating material on the additional carrier; and means for transferring the thus heated layer from the additional carrier onto the substrate in a second portion of said additional path so that one of said layers overlies the other of said layers.

6. The apparatus of claim 5, further comprising means for advancing the substrate along a second path having a portion adjacent the second portion of said predetermined path.

7. The apparatus of claim 5, wherein each of said carriers includes an endless belt conveyor.

8. The apparatus of claim 7, wherein each of said conveyors includes an elongated reach which receives the coating material in the first portion and transports the resulting layer to the second portion of the respective path, said conveying means comprises means for conveying inert gas from said source along the layer on said reach of the conveyor of said first carrier.

9. The apparatus of claim 8, wherein said conveying means is immediately adjacent the layer on said reach of the conveyor of said first carrier and has an open side facing aid reach of the conveyor of said first carrier.

10. The apparatus of claim 8, wherein said first carrier further includes means for moving the respective reach so as to advance the corresponding layer in a direction from said first to said second portion of said predetermined path, said conveying means including means for conveying inert gas along the layer on said reach of the conveyor of said first carrier counter to said direction.

11. The apparatus of claim 5, wherein each of said carriers includes an endless belt conveyor having an elongated reach which transports the respective layer from the first to the second portion of the respective path, said reaches being at least substantially parallel to each other.

12. The apparatus of claim 5, wherein each of said carriers includes an endless belt conveyor having an elongated reach which advances the respective layer from the first to the second portion of the respective path.

13. The apparatus of claim 5, wherein said first carrier includes an endless belt conveyor having an elongated reach which advances the respective layer in a direction from the first to the second portion of said predetermined path, said conveying means comprising a chamber adjacent said reach and having an open side facing the layer on said conveyor, said chamber further including an inlet connected with said source and an outlet for inert gas, said outlet being located upstream of said inlet as considered in said direction.

14. The apparatus of claim 5, wherein said first carrier includes an endless belt conveyor having an elongated reach which advances the respective layer from the first to the second portion of said predetermined path, said reach having a first side which caries the respective layer and a second side, said heating means being adjacent the second side of said reach.

15. The apparatus of claim 14, wherein said heating means includes a plurality of substantially rod-shaped heating elements.

16. The apparatus of claim 5, wherein said heating means includes an inductive heater including a portion at least of said first carrier.

17. The apparatus of claim 16, wherein said portion of said first carrier includes an iron core and said inductive heater further comprises an inductor having a primary winding, said core constituting the secondary winding of said inductor.

18. The apparatus of claim 5, wherein said heating means comprises an adjustable heater and further comprising means for adjusting said heater, said adjusting means including means for monitoring the temperature of said first carrier and means for altering the heating action of said heater when the monitored temperature of the first carrier deviates from a preselected temperature range.

19. Apparatus for coating a substrate with coating material, comprising a plurality of web-like carriers; means for advancing the carriers along predetermined paths; means for applying to each carrier in a first portion of the respective path a layer of coating material containing an evaporable solvent, the composition of at least one of said layers being different from that of at least one other layer; means for drying the layers on said carriers to expel at least some solvent therefrom; means for transferring the layers from the respective carriers onto the surface in second portions of the respective paths so that the thus transferred layers overlie each other; and means for contacting the layers with separate streams of an inert gas to gather the expelled solvent.

20. The apparatus of claim 19, wherein each of said carriers includes an endless belt conveyor having an elongated reach which advances the respective layer from the first to the second portion of the respective path.

21. The apparatus of claim 20, wherein each of said conveyors comprises a first stratum and a second stratum arranged to attract the respective layer with a predetermined force, said second strata being disposed between the respective first strata and the corresponding layers.

22. The apparatus of claim 20, wherein each of said conveyors comprises a first stratum and a second stratum arranged to repel the respective layer with a predetermined force, said second strata being disposed between the respective first strata and the corresponding layers.

* * * * *